United States Patent
Ahmed et al.

(10) Patent No.: US 8,364,155 B1
(45) Date of Patent: Jan. 29, 2013

(54) PROJECTING FUTURE COMMUNICATION LOADING IN A WIRELESS COMMUNICATION NETWORK

(75) Inventors: Syed U. Ahmed, Overland Park, KS (US); Rajeev Aggarwal, Overland Park, KS (US); Rickey Jack Haught, Lawrence, KS (US); Stephen R. Bales, Lee's Summit, MO (US); Feng Xie, Leawood, KS (US); Jorge T. Climaco, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 748 days.

(21) Appl. No.: 12/370,817

(22) Filed: Feb. 13, 2009

(51) Int. Cl.
*H04W 40/00* (2009.01)

(52) U.S. Cl. ............... 455/446; 455/422.1; 370/328; 370/338

(58) Field of Classification Search ............ 455/446, 455/422.1; 370/328–338
See application file for complete search history.

(56) References Cited

U.S. PATENT DOCUMENTS

| 6,094,580 | A | * | 7/2000 | Yu et al. ............... 455/446 |
| 6,937,863 | B1 | | 8/2005 | Gordon et al. |
| 7,069,537 | B2 | | 6/2006 | Lazarov |
| 2003/0186693 | A1 | * | 10/2003 | Shafran et al. ............ 455/423 |
| 2005/0044525 | A1 | | 2/2005 | Lazarov |
| 2010/0178925 | A1 | * | 7/2010 | Bernini et al. ............ 455/446 |

FOREIGN PATENT DOCUMENTS

WO  WO 2007071271 A1 * 6/2007

* cited by examiner

*Primary Examiner* — Chuong A Ngo

(57) ABSTRACT

A method of operating a computer system to project future communication loading for a wireless communication network that covers a geographic area having population data and a plurality of different land use descriptions is provided herein. The method comprises geographically separating the geographic area into a plurality of geographic bins, allocating historical communication loading to each one of the bins based on the population data and the land use descriptions, geographically allocating the bins to geographic sections of a new configuration for the wireless communication network, and totaling the historical communication loading from the bins in each one of the geographic sections to project the future communication loading for each one of the geographic sections in the new configuration of the wireless communication network.

20 Claims, 8 Drawing Sheets

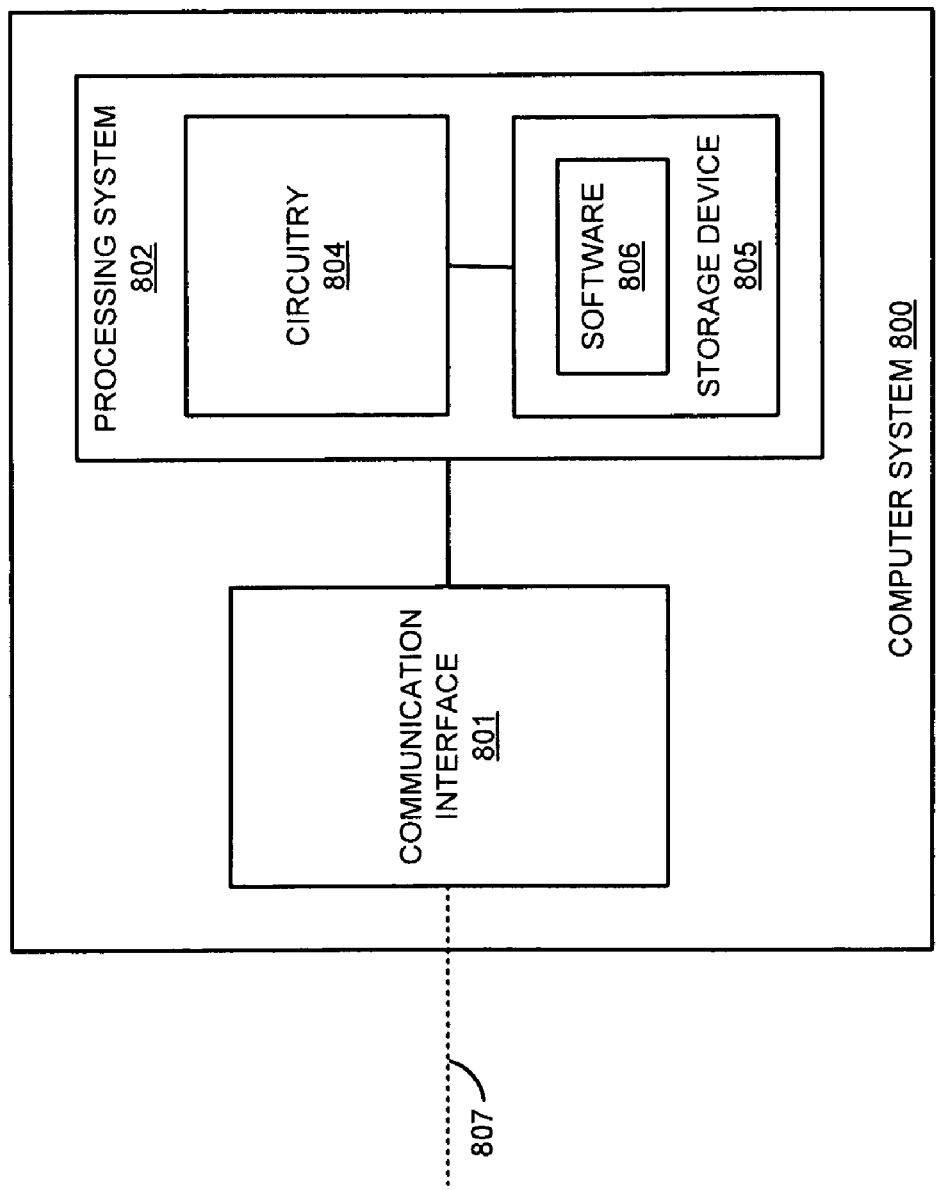

PROJECTING FUTURE COMMUNICATION LOADING IN A WIRELESS COMMUNICATION NETWORK

TECHNICAL BACKGROUND

Wireless communication systems are growing due to an increase in the number of mobile subscribers. Worldwide public demand, availability of cost-effective technology, and recent regulatory actions have all contributed to this growth of wireless telecommunications. With an increase in telecommunications traffic, infrastructures of cellular wireless systems may need to be reconfigured.

The infrastructure of a cellular wireless system may be reconfigured in many ways, such as by reallocating resources, reconfiguring cell sites, or by adding wireless communication equipment, such as a new base station or additional antennas for an existing base station. The coverage area of a base station may be reconfigured as well to provide service to additional areas. In addition, an increase in cell sites may be necessary to support an increase in wireless telecommunication traffic.

Typically, design and implementation of a new cell site requires a substantial amount of time and effort. Implementation requires selecting a suitable location for the cell site, obtaining building permits, constructing the cell site, creating backhaul links for the cell site, and testing the cell site. Given the amount of work required to implement a new cell site, the location selected for the new cell site should result in an optimal network configuration. Therefore, projecting future communication loading in a wireless communication network may be desirable in order to effectively plan and deploy new cell sites or optimize existing sites.

Overview

A method of operating a computer system to project future communication loading for a wireless communication network that covers a geographic area having population data and a plurality of different land use descriptions comprises geographically separating the geographic area into a plurality of geographic bins, allocating historical communication loading to each one of the bins based on the population data and the land use descriptions, geographically allocating the bins to geographic sections of a new configuration for the wireless communication network, and totaling the historical communication loading from the bins in each one of the geographic sections to project the future communication loading for each one of the geographic sections in the new configuration of the wireless communication network.

A software product for projecting future communication loading for a wireless communication network that covers a geographic area having population data and a plurality of different land use descriptions is provided herein. The software product comprises software and a storage device to store the software. The software is configured to direct a processing system to geographically separate the geographic area into a plurality of geographic bins, allocate historical communication loading to each one of the bins based on the population data and the land use descriptions, geographically allocate the bins to geographic sections of a new configuration for the wireless communication network, and total the historical communication loading from the bins in each one of the geographic sections to project the future communication loading for each one of the geographic sections in the new configuration of the wireless communication network.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein, but is intended to cover all alternatives, modifications, and equivalents.

FIG. 8 is a block diagram that illustrates a computer system.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
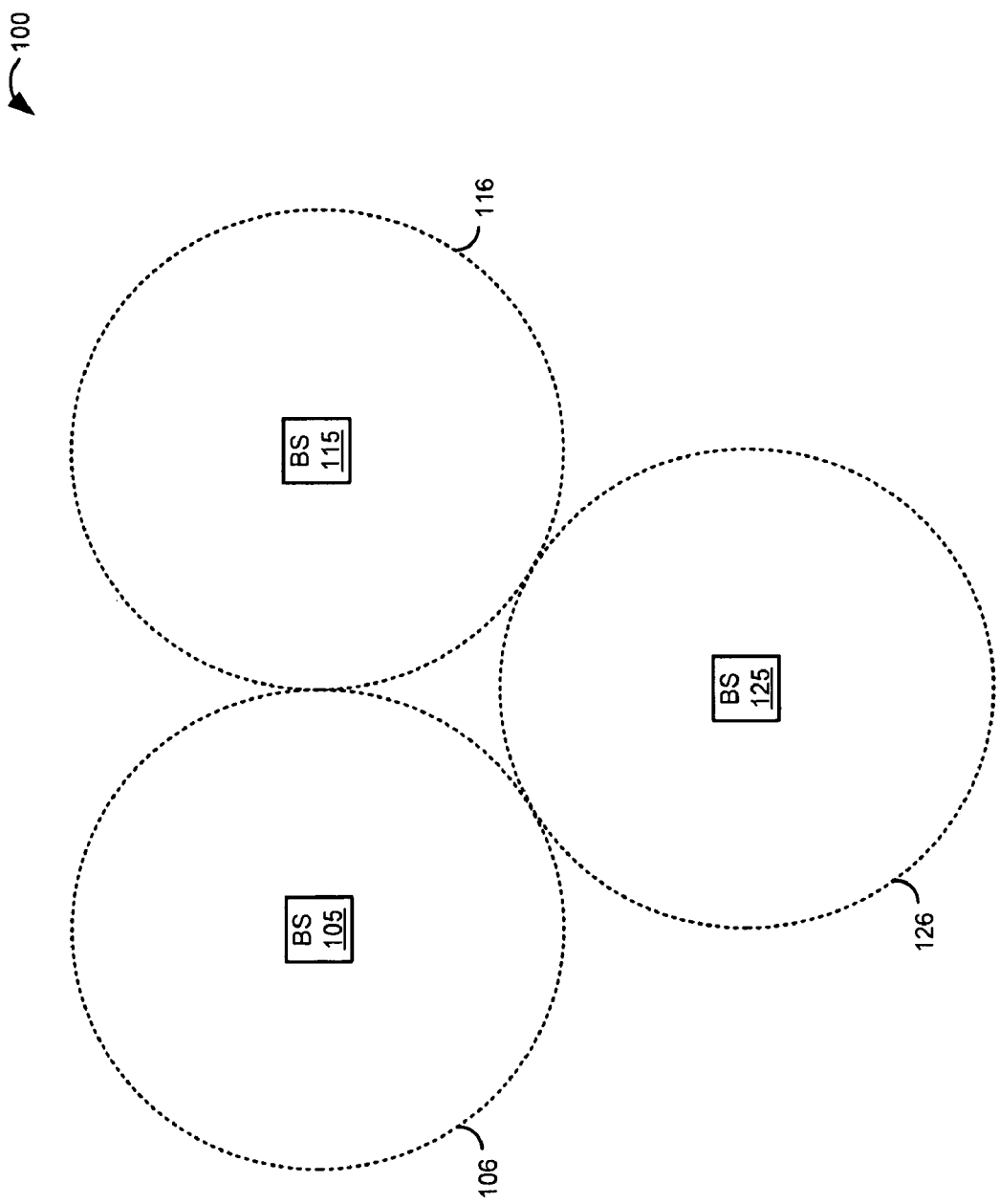
FIG. 1 is a block diagram that illustrates a wireless communication system.

FIG. 1 is a block diagram that illustrates wireless communication system 100. Wireless communication system 100 includes base stations 105, 115, and 125 that serve respective cells 106, 116, and 126. The cells are geographic areas with approximate boundaries as indicated by the dotted lines on FIG. 1. The cell boundaries indicate the approximate wireless communication range of the associated base station in that cell. Note that while the cells depicted in FIG. 1 are all adjacent and do not overlap, the present invention contemplates any wireless communication system having various cell arrangements, including cells that partially overlap and cells that are entirely contained within other cells. Also, one of skill in the art will understand that the present invention is not limited to wireless communication systems with only three cells, but may have any number of cells, including only one cell.

Base stations 105, 115, and 125 may each comprise any wireless system that provides an air interface to mobile stations and communication connectivity to a communication network. Examples of base stations that may be utilized include base transceiver stations (BTSs), base station controllers (BSCs), base stations (BSs), radio base stations (RBSs), Node B, enhanced Node B (eNB), and others. Base stations 105, 115, and 125 comprise antennas, transceivers, amplifiers, filters, routers, servers, combiners, duplexers, or some other communication components—including combinations thereof. Further, base stations 105, 115, and 125 may each comprise one antenna or multiple antennas having corresponding sectors and frequency assignments. Base stations 105, 115, and 125 may each have several transceivers and corresponding antennas which allow them to serve several different frequencies and different sectors of the base station.

Figure 2:
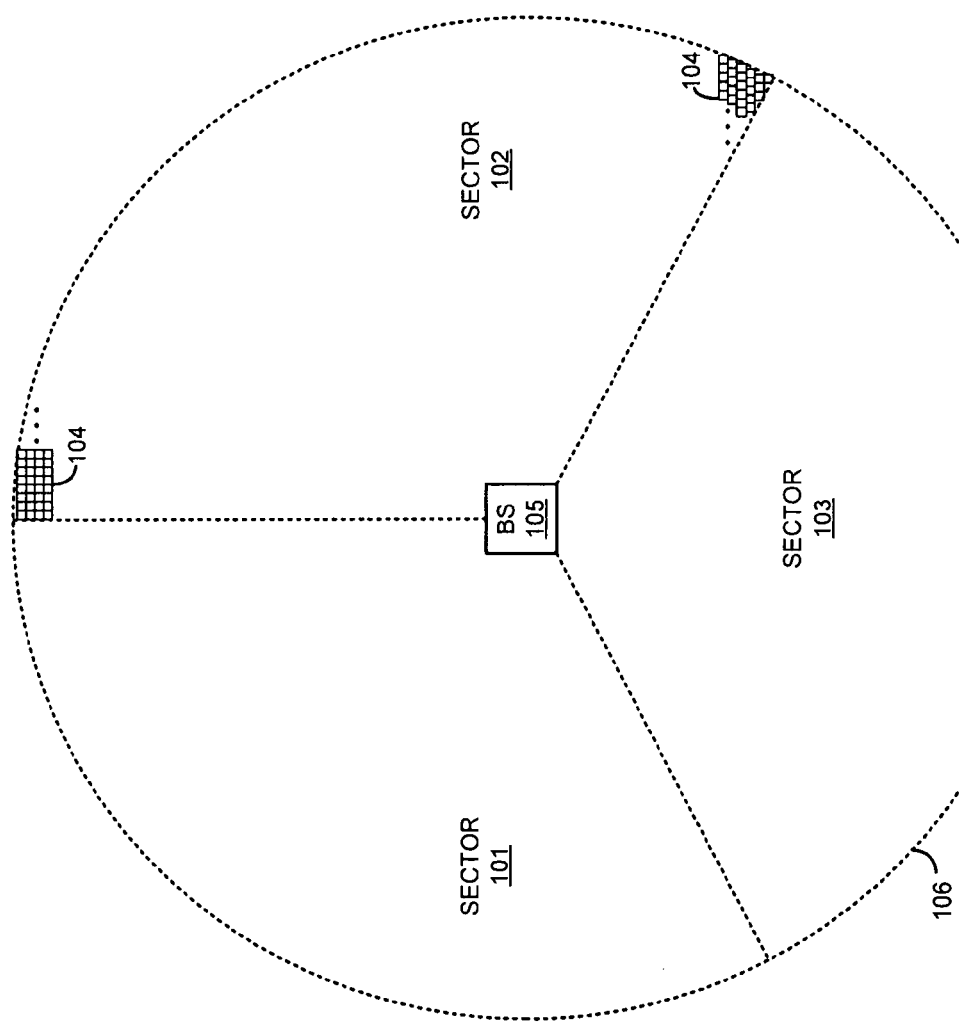
FIG. 2 is a block diagram that illustrates a base station.

FIG. 2 is a block diagram that illustrates base station 105. FIG. 2 provides further detail regarding cell 106 served by base station 105. Cell 106 is a geographic area with an approximate boundary as indicated by the dotted circle in FIG. 2. The boundary of cell 106 indicates the approximate wireless communication range of base station 105.

Cell 106 is subdivided into a number of sections, designated by the dotted lines within cell 106 as sectors 101, 102, and 103. Cell 106 thus depicts a trisector cell, in which there are three sectors. For example, each sector 101, 102, and 103 may be served by separate antennas in base station 105, providing each sector a separate direction of tracking of roughly 120 degrees with respect to the adjacent sectors. Note that although three sectors are depicted in cell 106, the present invention is not limited to cell configurations of only three sections but may comprise any number of sections. Further, cell 106 may be served by a base station comprising a unidirectional antenna, resulting in no sectorization. Also, it should be noted that the sectors within cell 106 represent only one method of segmenting the cell, and one of skill in the art will recognize that the area within cell 106 could have many different sections or arrangements.

Sector 102 comprises bins 104. Each bin 104 comprises physical space of a much smaller area than sector 102. Bins 104 could comprise circles, squares, polygons, or some other shape that covers less than 40,000 square feet (200 ft×200 ft). For example, each bin may cover 625 square feet (25 ft×25 ft), 2,500 square feet (50 ft×50 ft), 5,625 square feet (75 ft×75 ft), 10,000 square feet (100 ft×100 ft), 15,625 square feet (125 ft×125 ft), 22,500 square feet (150 ft×150 ft), or 30,625 square feet (175 ft×175 ft). While only a limited number of bins 104 are shown within sector 102 in FIG. 2 for the sake of clarity, the present invention contemplates subdividing each sector 101, 102, and 103 into a plurality of bins 104, such that all physical space within each sector 101, 102, and 103 is covered by bins 104 in a granular fashion.

For each bin 104, the utilization and signal strength is calculated. Using existing network data, the total load for each sector 101, 102, and 103 can be used to calculate the total load for each bin 104. For example, the actual sector Bouncing Busy Hour (BBH) erlang traffic could be used to calculate the BBH erlang traffic of each bin 104 within that sector. The details of the calculation are provided below in the description of FIG. 4. When the calculation is complete, the erlang traffic and signal strength of each bin 104 is known.

Figure 3:
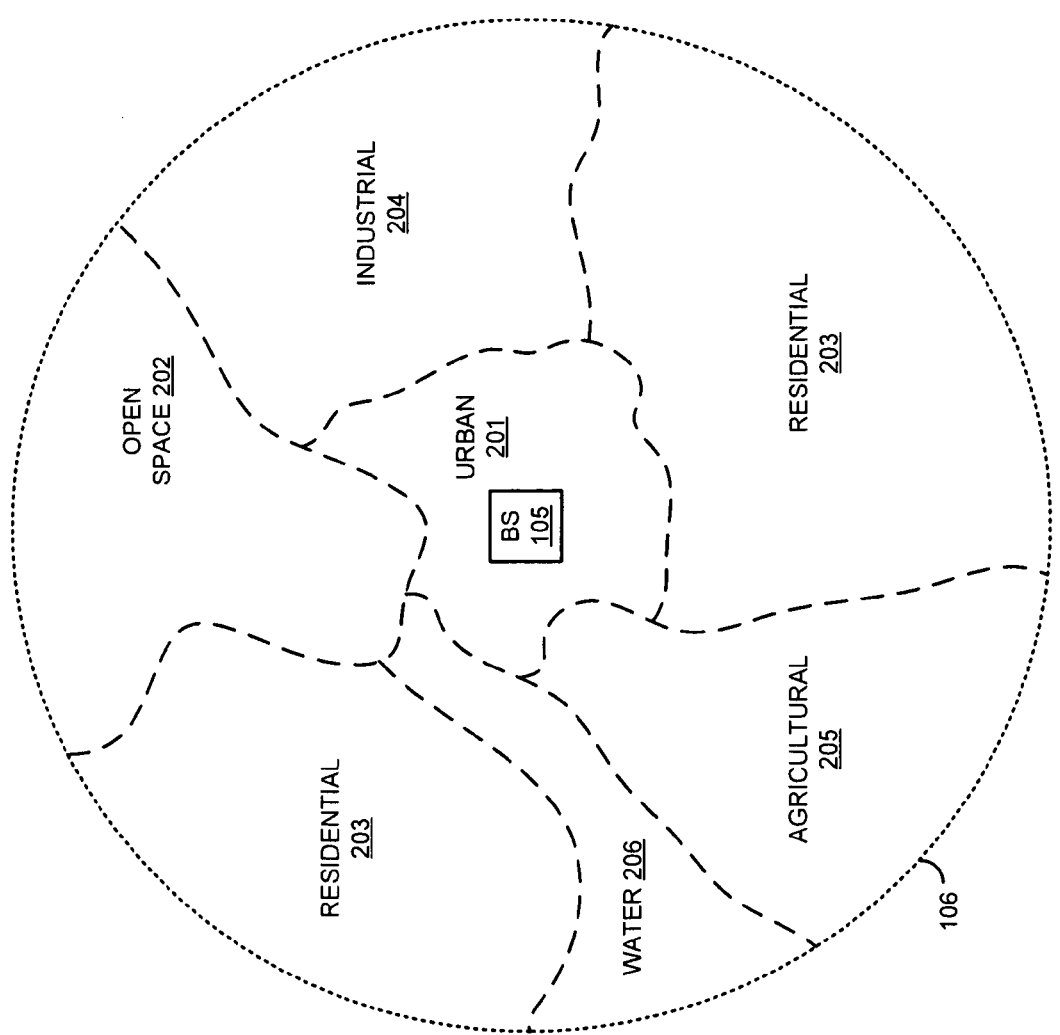
FIG. 3 is a block diagram that illustrates a base station.

FIG. 3 is a block diagram that illustrates base station 105, wherein cell 106 served by base station 105 is subdivided by geographic regions. Sectors 101-103 and bins 104 are not shown in FIG. 3 for the purpose of clarity.

Using a geographic map of the area, cell 106 is subdivided into various geographic regions 201-206, depicted by the dashed lines within cell 106. Urban 201 comprises an urban center of a city or metropolitan area, such as a downtown region. Open space 202 comprises undeveloped land, and may comprise a wildlife preserve or other protected area. Residential 203 comprises an area of land characterized by private residences, such as a residential neighborhood. Industrial 204 comprises an area of land related to companies engaged in the manufacture of products. Agricultural 205 comprises an area of land used in the business of farming, such as cultivating soil, producing crops, and raising livestock. Water 206 comprises a body of water, such as a lake or river. Note that the geographic regions 201-206 within cell 106 are merely exemplary, and a cell may contain more or fewer types of geographic regions than those depicted in FIG. 3.

Figure 4:
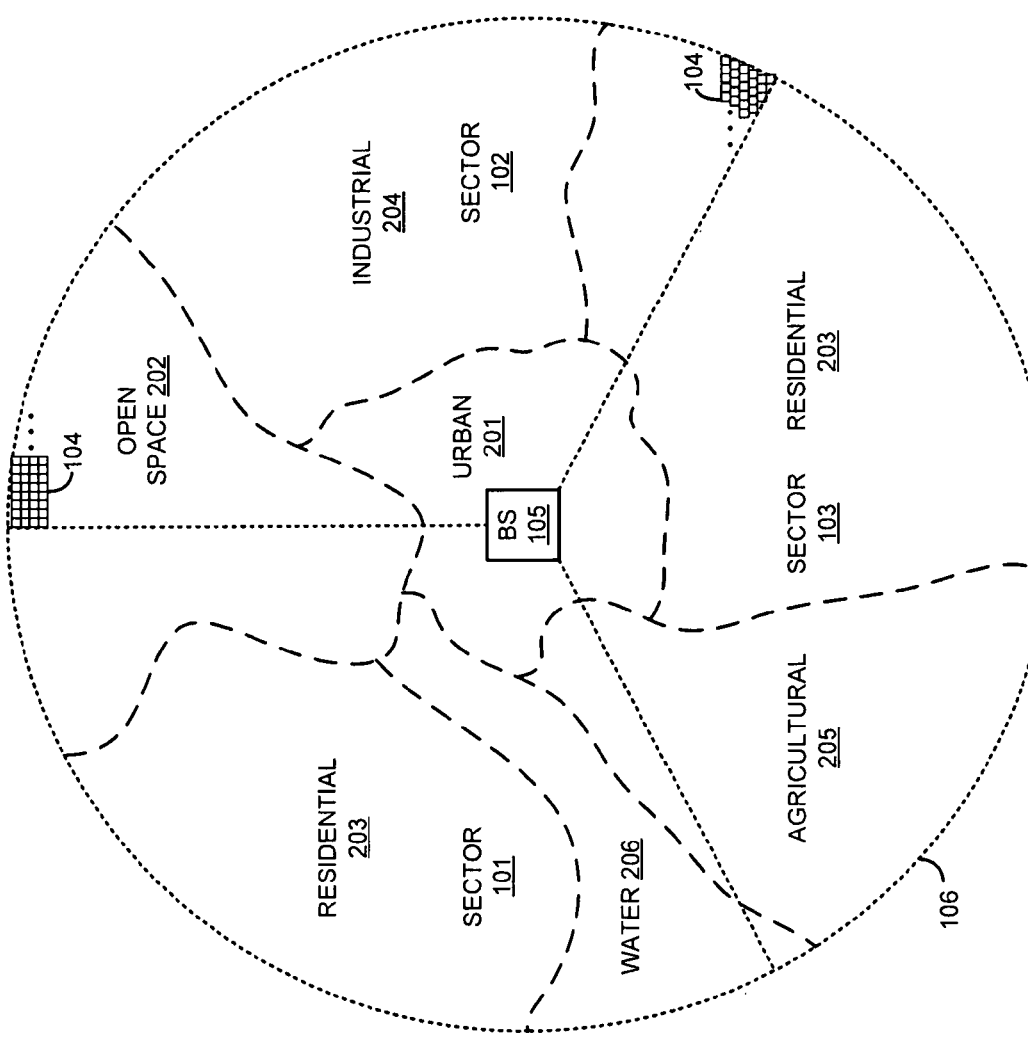
FIG. 4 is a block diagram that illustrates a base station.

FIG. 4 is a block diagram that illustrates base station 105, wherein cell 106 served by base station 105 is subdivided by sectors 101-103 and geographic regions 201-206. Further, each sector 101-103 is subdivided into a plurality of bins 104, but only a limited number of bins 104 are shown within sector 102 for the sake of clarity.

Once cell 106 is separated into its various geographic regions, census data is used to calculate the total population per region per sector. The population is summed per region type within a sector, and then normalized to determine a ratio of population for each region type within that sector, referred to as clutter weights. To normalize the data and calculate the clutter weights of each region type per sector, the population of each region type within the sector is divided by the population of the region type with the lowest population. Note that if any region type has zero population, a divisor of one would be used to avoid "divide by zero" errors.

The following example will discuss the region types 201-204 and bins 104 within sector 102. Sector 102 comprises a portion of urban 201, a portion of open space 202, a portion of residential 203, and industrial 204. The portion of urban 201 within sector 102 may have a population of 5,000, the portion of open space 202 may have a population of 100, the portion of residential 203 may have a population of 3,000, and industrial 204 may have a population of 1,000. To normalize the data, the population of each region type is divided by the population of the region type with the lowest population; in this case, open space 202 has the lowest population of 100. After normalizing the populations by region type, the clutter weights in sector 102 under this example would be 500 for urban 201, 1 for open space 202, 300 for residential 203, and 100 for industrial 204.

The clutter weights of each region type within a sector are divided by the sum of all the clutter weights within the sector to calculate clutter weight percentages per region type per sector. The clutter weight percentages per region type per sector are then multiplied by the total erlang traffic within the sector to determine the erlang traffic per region type per sector. Each erlang traffic per region type per sector value is then divided by the total number of bins 104 within each corresponding region type per sector to calculate the erlang traffic allocated to each bin 104 of each geographic type 201-206 within each sector 101-103.

Continuing the example above, the clutter weights of each region type within sector 102 are divided by the sum of all the clutter weights within sector 102 to generate a clutter weight percentage per region type per sector 102. The sum of all clutter weights within sector 102 is 901, thus within sector 102, the clutter weight percentage for urban 201 is 500 divided by 901 equals 0.555, the clutter weight percentage for open space 202 is 1 divided by 901 equals 0.001, the clutter weight percentage for residential 203 is 300 divided by 901 equals 0.333, and the clutter weight percentage for industrial 204 is 100 divided by 901 equals 0.111, so that the clutter weight percentages per region type 201-204 within sector 102 sum to one.

The clutter weight percentages per region type per sector 102 are then multiplied by the total erlang traffic within sector 102 to determine the erlang traffic per region type per sector. For purposes of this example, assume the total erlang traffic of sector 102 is 1000. Thus, in sector 102, the erlang traffic per urban region 201 is 0.555 times 1000 equals 555, the erlang traffic per open space region 202 is 0.001 times 1000 equals 1, the erlang traffic per residential region 203 is 0.333 times 1000 equals 333, and the erlang traffic per industrial region 204 is 0.111 times 1000 equals 111.

Each erlang traffic per region type per sector value is then divided by the total number of bins 104 within each corresponding region type in sector 102 to calculate the erlang traffic allocated to each bin 104 of each geographic type 201-204 within sector 102. For purposes of this example, assume that the portion of urban 201 within sector 102 has 125 bins 104, the portion of open space 202 within sector 102 has 200 bins 104, the portion of residential 203 within sector 102 has 150 bins 104, and industrial 204 within sector 102 has 500 bins 104. Thus, in sector 102, the erlang traffic allocated to each bin 104 of urban region 201 is 555 divided by 125 equals 4.44, the erlang traffic allocated to each bin 104 of open space region 202 is 1 divided by 200 equals 0.005, the erlang traffic allocated to each bin 104 of residential region 203 is 333 divided by 150 equals 2.22, and the erlang traffic allocated to each bin 104 of industrial region 204 is 111 divided by 500 equals 0.222.

Advantageously, knowledge of the erlang traffic allocated to each bin 104 per region type per sector allows a service provider to predict new traffic and shifts in existing traffic due to proposed new cell sites and planned optimization changes in the service provider's network. The method described herein allows a service provider to predict traffic offloads, new captured traffic, and shifts in existing traffic when a new cell site is introduced within the existing coverage area or for coverage expansion, when optimization changes are made to an existing site, or when traffic migrates from one network to another. Knowledge of the erlang traffic allocated to each bin 104 allows for optimal deployment of new cell sites to best utilize the additional capacity. In addition, when planning optimization changes or the addition of new cell sites, service providers can predict and identify changes in capacity requirements across the sectors. Further, the method may allow for earlier identification of underutilized assets.

In one example, a service provider may determine the effect of changing the existing network configuration. Using the granular network data gleaned from knowledge of the erlang traffic allocated to each bin 104, the service provider may determine the predicted traffic relative to each cell site for a proposed optimization change. In addition, the traffic offload from existing cell sites to proposed cell sites can be determined, allowing for strategic and optimal deployment of new cell sites with regard to existing configurations.

Figure 5:
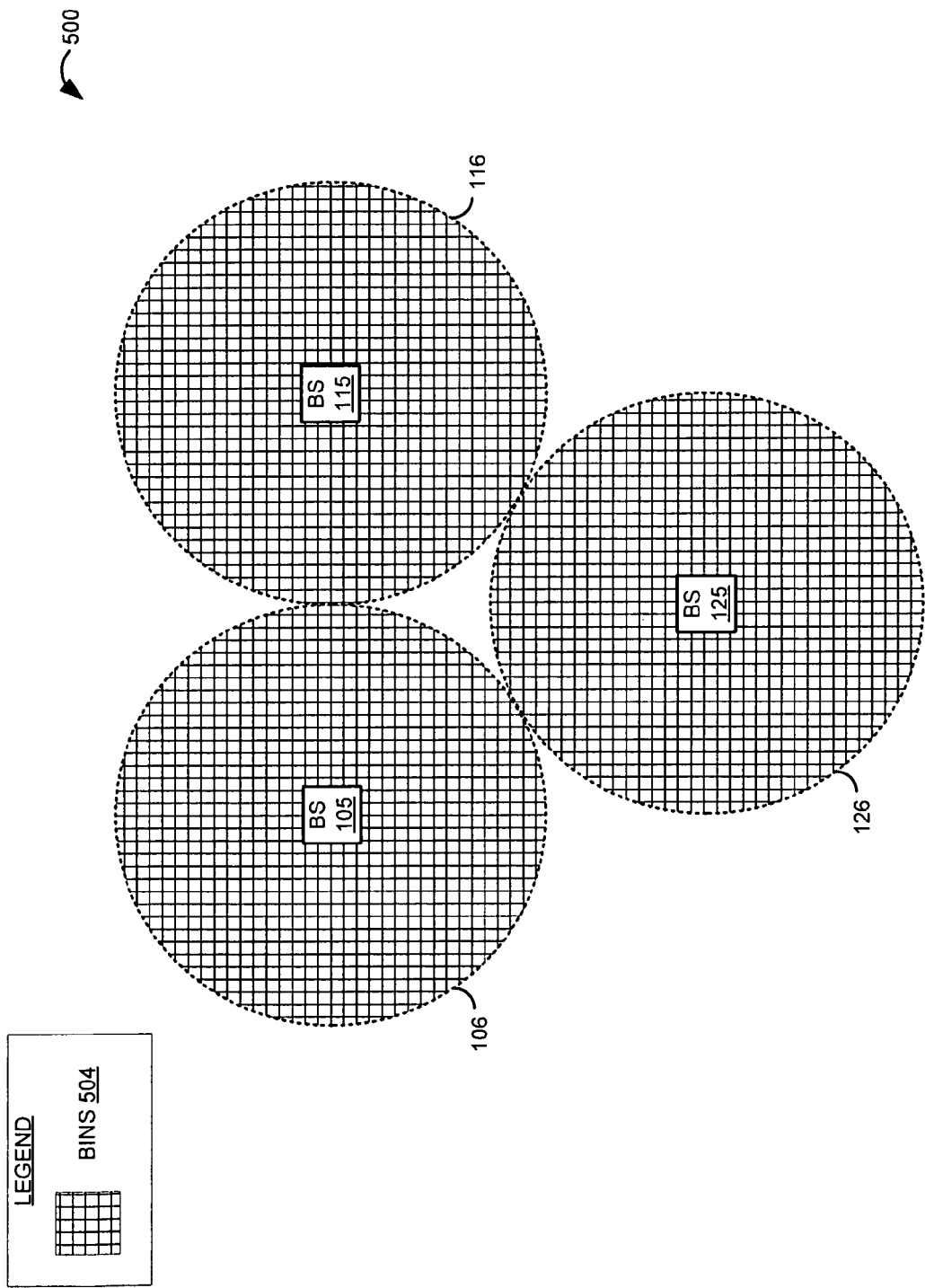
FIG. 5 is a block diagram that illustrates a wireless communication system.

FIG. 5 is a block diagram that illustrates wireless communication system 500. Wireless communication system 500 includes base stations 105, 115, and 125 that serve respective cells 106, 116, and 126. Wireless communication system 500 is identical to wireless communication system 100 of FIG. 1, except that wireless communication system 500 illustrates the geographic area of cells 106, 116, and 126 completely covered with bins 504. While depicted as small square shapes in FIG. 5, the geographic bins 504 could comprise circles, polygons, or some other shape that covers less than 40,000 square feet (200 ft×200 ft). Each bin 504 is allocated historical communication loading based on population data and land use descriptions as previously described in FIG. 4.

Figure 6:
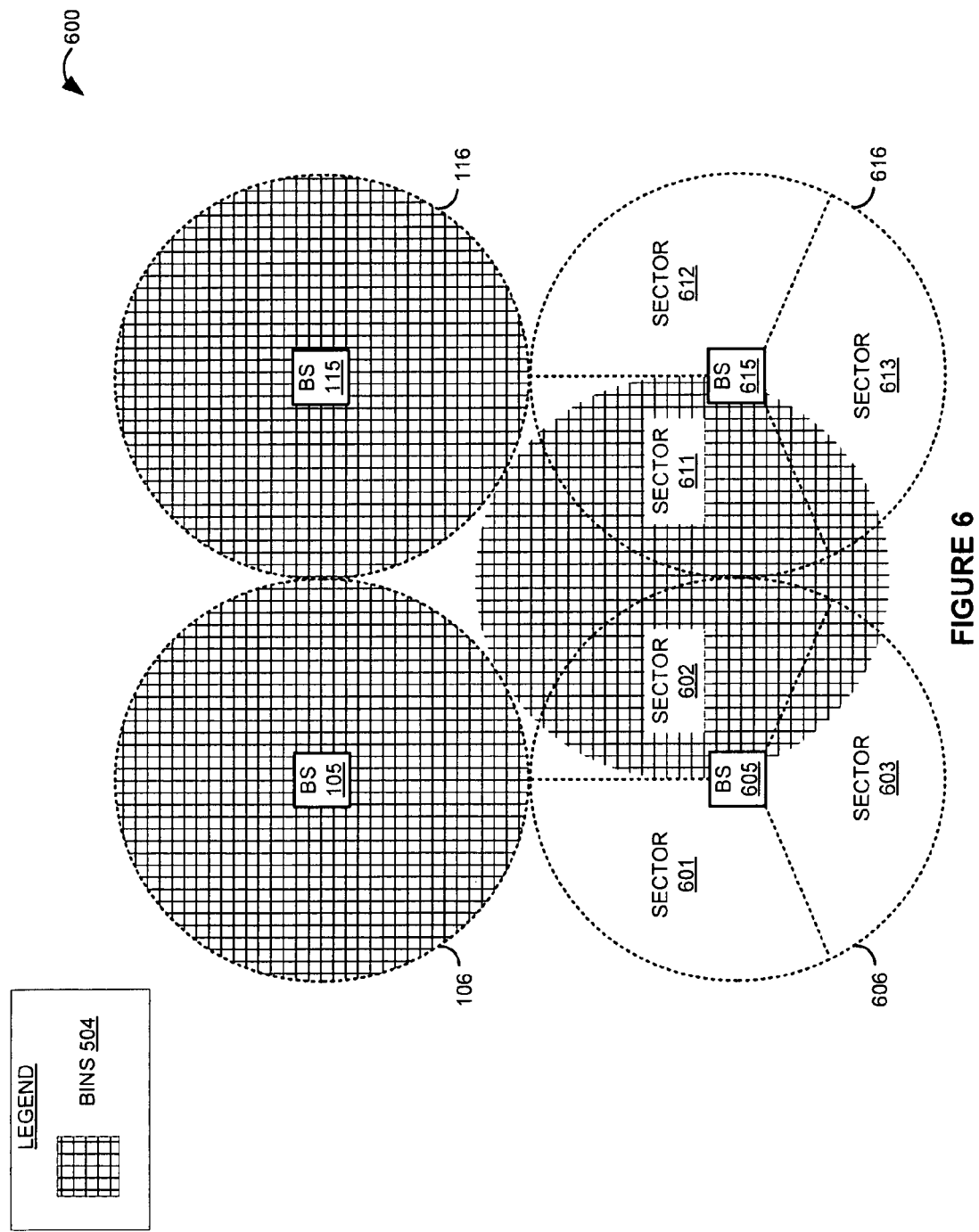
FIG. 6 is a block diagram that illustrates a wireless communication system.

FIG. 6 is a block diagram that illustrates wireless communication system 600. Wireless communication system 600 depicts a similar geographic area as FIGS. 1 and 5, but illustrates a new network configuration with respect to wireless communication systems 100 and 500. As in FIGS. 1 and 5, wireless communication system 600 comprises base stations 105 and 115 that serve respective cells 106 and 116. However, base station 125 has been removed from the network configuration of wireless communication system 600, and new base stations 605 and 615 that serve respective cells 606 and 616 have been added. The grid pattern shading represents bins 504 as discussed above in FIG. 5. Each bin 504 is allocated historical communication loading based on population data and land use descriptions.

Cell 606 is subdivided into a number of sections, designated by the dotted lines within cell 606 as sectors 601, 602, and 603. Likewise, cell 616 is subdivided into a number of sections, designated by the dotted lines within cell 616 as sectors 611, 612, and 613. It should be noted that the sectors within cells 606 and 616 represent only one method of segmenting the cells, and one of skill in the art will recognize that the area within cells 606 and 616 could have many different sections or arrangements.

Advantageously, knowledge of the historical communication loading allocated to each bin 504 allows a service provider to predict new traffic and shifts in existing traffic due to proposed new cell sites and planned optimization changes in the service provider's network. In wireless communication system 600, base station 125 has been removed, but the historical communication loading allocated to bins 504 in the geographic area previously served by base station 125 is known. New base stations 605 and 615 have been strategically placed to provide coverage to most of the geographic area formerly served by base station 125 in wireless communication systems 100 and 500. Note that some areas previously covered by base station 125 in wireless communication systems 100 and 500 are not receiving coverage under the new network configuration in wireless communication system 600. The areas losing coverage may be due to a determination that the areas were not utilizing base station 125, or perhaps a future network configuration will position a fifth base station to provide coverage to these areas.

By totaling the historical communication loading from the bins 504 within each one of the sectors 602, 603, 611, and 613, a service provider can project future communication loading for each one of the sectors in the new network configuration. Since the historical communication loading of bins 504 is known, the bins 504 within sectors 602, 603, 611, and 613 allow a service provider to predict traffic offloads from former base station 125, and also determine the amount of new traffic each new base station 605 and 615 has captured.

The addition of new cell sites 606 and 616 uncovered areas which previously had no service coverage. New coverage areas, represented by the white space within cells 606 and 616, represent geographic areas that received no coverage under the previous network configuration of wireless communication system 100 and 500. For example, sectors 601 and 612 contain no bins 504; thus, sectors 601 and 612 comprise entirely new coverage areas, and any traffic they receive represents newly captured traffic.

For the purpose of network configuration planning, a service provider may want to allocate communication loading to newly uncovered bins within the new coverage areas. Since the newly uncovered areas did not previously have wireless service, no existing network data or historical communication loading is known for purposes of calculating the communication loading to allocate to each uncovered bin. Thus, projected data must be allocated to the newly uncovered bins. The projected communication loading is calculated by multiplying an average communication load per user times a wireless service penetration rate times a wireless service provider penetration rate.

For example, to calculate the projected communication loading, an average communication load per user could be multiplied by the specific service provider's penetration rates in the area and multiplied by the overall wireless service penetration rates in the area. The resultant product could be used to estimate the average load of the newly uncovered bins. In one example, the average communication load per user could comprise an average usage per subscriber during one Busy Hour. The average communication load per user could be determined per cell or per cell section. Further, if bins 504 have been allocated to a portion of a cell or section of a cell, the projected communication loading would only be allocated to the unallocated portions of the cell or section. Advantageously, the estimated average load of the newly uncovered bins allows the service provider to simulate multiple prospective cell site locations to determine an optimal network configuration.

Figure 7:
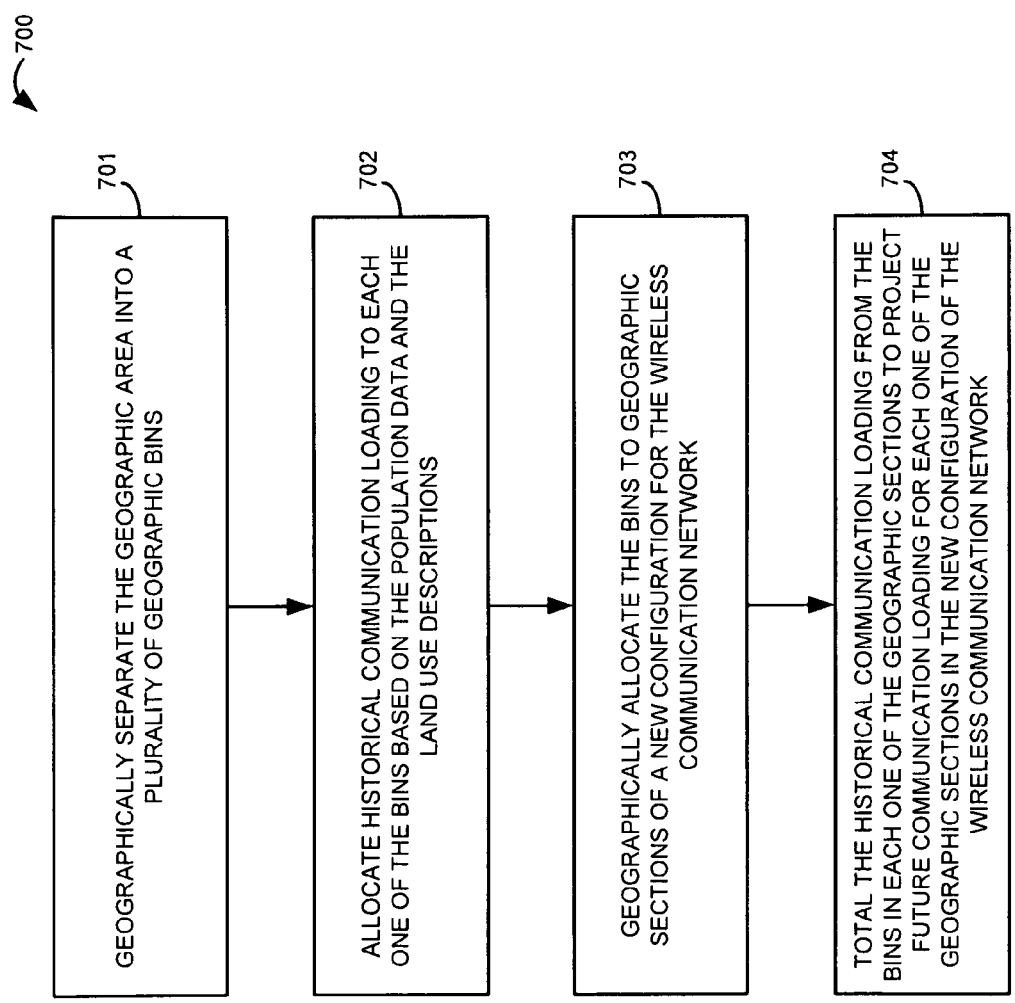
FIG. 7 is a flow diagram that illustrates an operation of a wireless communication system.

FIG. 7 illustrates an operation of wireless communication system 100. Method 700 described herein is useful for projecting future communication loading for wireless communication system 100, which covers a geographic area having population data and a plurality of different land use descriptions.

The operation begins by geographically separating the geographic area of wireless communication system 100 into a plurality of geographic bins 104 (operation 701). The geographic bins 104 could comprise circles, squares, polygons, or some other shape that covers less than 40,000 square feet (200 ft×200 ft). For example, each bin may cover 625 square feet (25 ft×25 ft), 2,500 square feet (50 ft×50 ft), 5,625 square feet (75 ft×75 ft), 10,000 square feet (100 ft×100 ft), 15,625 square feet (125 ft×125 ft), 22,500 square feet (150 ft×150 ft), or 30,625 square feet (175 ft×175 ft). The present invention contemplates subdividing the entire geographic area of wireless communication system 100 into a plurality of bins 104, such that all physical space covered by the cells in wireless communication system 100 is covered by bins 104 in a granular fashion.

As an example of operation 701, each cell 106, 116, and 126 within wireless communication system 100 may be subdivided by sections. The sections could comprise sectors, base station coverage areas, or some other segmentation scheme. Once each cell 106, 116, and 126 is divided by sections, each section is subdivided into a plurality of bins 104. Each bin 104 covers a much smaller geographic area than the cells 106, 116, and 126.

Continuing with method 700, historical communication loading is then allocated to each one of the bins 104 based on the population data and the land use descriptions (operation 702). The historical communication loading could comprise erlang traffic, busy hour erlang traffic, or bouncing busy hour (BBH) erlang traffic, for example. The land use descriptions could comprise a plurality of geographic regions, such as urban, residential, industrial, agricultural, open space, or water. The population data may be obtained from publicly available census data.

As an example of operation 702, each cell may be separated into several sections and various land use descriptions. The population data is then used to calculate the total population per land use type per section. The population is summed per land use type within a section, and then normalized to determine a ratio of population for each land use type within that section, referred to as clutter weights. To normalize the data and calculate the clutter weights of each land use type per section, the population of each land use type within each section is divided by the population of the land use type with the lowest population. Note that if any land use type has zero population, a divisor of one would be used to avoid "divide by zero" errors.

The clutter weights of each land use type within a section are then divided by the sum of all the clutter weights within that section to calculate clutter weight percentages per land use type per section. The clutter weight percentages per land use type per section are then multiplied by the total historical communication loading within that section to determine the historical communication loading per land use type per section. Each historical communication loading per land use type per section value is then divided by the total number of bins 104 within each corresponding land use type per section to calculate the historical communication loading to allocate to each bin 104 of each land use type within each section.

Method 700 continues by geographically allocating the bins 104 to geographic sections of a new configuration for the wireless communication network (operation 703). For example, a new network configuration may relocate existing base stations, remove existing base stations, or add new base stations—including combinations thereof. The cells created by the base stations in the new network configuration may be subdivided by several sections. The sections could comprise sectors, base station coverage areas, or some other segmentation scheme. The bins 104 are then geographically allocated to the geographic sections of the new network configuration. In one example, the cells are not subdivided by sections, so geographically allocating the bins 104 to geographic sections of a new configuration for the wireless communication network comprises geographically allocating the bins 104 to entire cells of the new configuration for the wireless communication network.

The historical communication loading from the bins 104 in each one of the geographic sections is then totaled to project future communication loading for each one of the geographic sections in the new configuration of the wireless communication network (operation 704). By totaling the historical communication loading from the bins 104 within each one of the geographic sections, a service provider can project future communication loading for each one of the sections in the new network configuration. Since the historical communication loading of bins 104 is known, the bins 104 allocated to the geographic sections of the new configuration allow a service provider to predict traffic offloads and determine the amount of new traffic captured by each base station in the new network configuration.

FIG. 8 illustrates computer system 800 in an embodiment of the invention. Computer system 800 comprises communication interface 801 and processing system 802. Processing system 802 is linked to communication interface 801. Processing system 802 includes circuitry 804 and storage device 805 that stores software 806.

Communication interface 801 comprises components that transmit and receive communication signals over communication link 807 under the control of processing system 802. These components include transceiver and signal processing circuitry.

Circuitry 804 comprises microprocessor and associated circuitry that retrieves and executes software 806 from storage device 805. Storage device 805 comprises a disk drive, flash drive, memory circuitry, optical disc, or some other memory device. Software 806 comprises computer programs, firmware, or some other form of machine-readable processing instructions. Although storage device 805 is shown within computer system 800, a portion of storage device 805 could be externally located. For example, storage device 805 may comprise an external memory apparatus that stores software 806 for subsequent transfer to an internal memory device within computer system 800.

When executed by circuitry 804, software 806 directs processing system 802 to operate computer system 800 as described herein. In particular, software 806 comprises computer-readable processing instructions to direct processing system 802 to geographically separate a geographic area having population data and a plurality of different land use descriptions into a plurality of geographic bins, allocate historical communication loading to each one of the bins based on the population data and the land use descriptions, geographically allocate the bins to geographic sections of a new configuration for the wireless communication network, and total the historical communication loading from the bins in each one of the geographic sections to project the future communication loading for each one of the geographic sections in the new configuration of the wireless communication network.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a computer system to project future communication loading for a wireless communication network that covers a geographic area having population data and a plurality of different land use descriptions, the method comprising:
    geographically separating the geographic area into a plurality of geographic sections of an initial configuration for the wireless communication network;
    geographically separating the geographic sections into a plurality of geographic bins;
    determining individual population data and individual land use descriptions for each of the geographic sections based on the population data and the different land use descriptions of the geographic area;
    allocating historical communication loading to each one of the bins based on the individual population data and the individual land use descriptions for each of the geographic sections;
    in the computer system, geographically allocating the bins to new geographic sections of a new configuration for the wireless communication network; and
    totaling the historical communication loading from the bins in each one of the new geographic sections to project the future communication loading for each one of the new geographic sections in the new configuration of the wireless communication network.

2. The method of claim 1 wherein the bins cover less than 40,000 square feet.

3. The method of claim 1 wherein the bins cover less than 10,000 square feet.

4. The method of claim 1 wherein the bins cover less than 2,500 square feet.

5. The method of claim 1 wherein the geographic sections comprise sectors.

6. The method of claim 1 wherein the geographic sections comprise base station coverage areas.

7. The method of claim 1 wherein the historical communication loading comprises erlang traffic.

8. The method of claim 1 wherein the historical communication loading comprises busy hour erlang traffic.

9. The method of claim 1 further comprising:
    allocating projected communication loading for unallocated portions of each one of the new geographic sections in the new configuration of the wireless communication network.

10. The method of claim 9 wherein the projected communication loading is calculated by multiplying an average communication load per user times a wireless service penetration rate times a wireless service provider penetration rate.

11. A non-transitory computer-readable medium having stored thereon program instructions for projecting future communication loading for a wireless communication network that covers a geographic area having population data and a plurality of different land use descriptions,
    wherein the program instructions, when executed by a processing system, direct the processing system to:
    geographically separate the geographic area into a plurality of geographic sections of an initial configuration for the wireless communication network;
    geographically separate the geographic sections into a plurality of geographic bins;
    determine individual population data and individual land use descriptions for each of the geographic sections based on the population data and the different land use descriptions of the geographic area;
    allocate historical communication loading to each one of the bins based on the individual population data and the individual land use descriptions for each of the geographic sections;
    geographically allocate the bins to new geographic sections of a new configuration for the wireless communication networ kand
    total the historical communication loading from the bins in each one of the new geographic sections to project the future communication loading for each one of the new geographic sections in the new configuration of the wireless communication network.

12. The non-transitory computer-readable medium of claim 11 wherein the bins cover less than 40,000 square feet.

13. The non-transitory computer-readable medium of claim 11 wherein the bins cover less than 10,000 square feet.

14. The non-transitory computer-readable medium of claim 11 wherein the bins cover less than 2,500 square feet.

15. The non-transitory computer-readable medium of claim 11 wherein the geographic sections comprise sectors.

16. The non-transitory computer-readable medium of claim 11 wherein the geographic sections comprise base station coverage areas.

17. The non-transitory computer-readable medium of claim 11 wherein the historical communication loading comprises erlang traffic.

18. The non-transitory computer-readable medium of claim 11 wherein the historical communication loading comprises busy hour erlang traffic.

19. The non-transitory computer-readable medium of claim 11 further comprising:
    the software configured to direct the processing system to allocate projected communication loading for unallocated portions of each one of the new geographic sections in the new configuration of the wireless communication network.

20. The non-transitory computer-readable medium of claim 19 wherein the software directs the processing system to calculate the projected communication loading by multiplying an average communication load per user times a wireless service penetration rate times a wireless service provider penetration rate.

* * * * *